(12) United States Patent
Gao et al.

(10) Patent No.: US 10,678,367 B1
(45) Date of Patent: Jun. 9, 2020

(54) COMPRESSIVE TOUCH SENSING

(71) Applicant: Apple Inc., Cupertino, CA (US)

(72) Inventors: Kanke Gao, Fremont, CA (US);
Chung-Ming Chang, Sunnyvale, CA (US); Jiayi Jin, San Jose, CA (US);
Ruo-Gu Huang, San Jose, CA (US);
Taif A. Syed, Cupertino, CA (US); Wei Hsin Yao, Palo Alto, CA (US); Weijun Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/261,620

(22) Filed: Sep. 9, 2016

Related U.S. Application Data

(60) Provisional application No. 62/217,698, filed on Sep. 11, 2015.

(51) Int. Cl.
| | | |
|---|---|---|
| *G06F 3/041* | (2006.01) | |
| *G06F 3/044* | (2006.01) | |
| *G02F 1/1333* | (2006.01) | |
| *G02F 1/1343* | (2006.01) | |
| *G02F 1/1362* | (2006.01) | |
| *G02F 1/1368* | (2006.01) | |

(52) U.S. Cl.
CPC ............ *G06F 3/0416* (2013.01); *G06F 3/044* (2013.01); *G06F 3/0412* (2013.01); *G02F 1/1368* (2013.01); *G02F 1/13338* (2013.01); *G02F 1/134336* (2013.01); *G02F 1/136286* (2013.01); *G02F 2201/121* (2013.01); *G02F 2201/123* (2013.01); *G06F 2203/04101* (2013.01); *G06F 2203/04104* (2013.01)

(58) Field of Classification Search
None
See application file for complete search history.

(56) References Cited

U.S. PATENT DOCUMENTS

| 5,483,261 A | 1/1996 | Yasutake |
|---|---|---|
| 5,488,204 A | 1/1996 | Mead et al. |
| (Continued) | | |

FOREIGN PATENT DOCUMENTS

| JP | 2000-163031 A | | 6/2000 |
|---|---|---|---|
| JP | 2002-342033 A | | 11/2002 |
| KR | 10-20150113216 | * | 8/2015 |

OTHER PUBLICATIONS

Candes, E. J. et al. (Mar. 2008). "An introduction to Compressive Sampling," IEEE Signal Processing Magazine., vol. 25, No. 2, pp. 21-30.

(Continued)

*Primary Examiner* — Ifedayo B Iluyomade
(74) *Attorney, Agent, or Firm* — Kubota & Basol LLP

(57) ABSTRACT

A touch sensor panel is disclosed. The touch sensor panel can include a plurality of touch nodes, the plurality of touch nodes including a first set of touch nodes and a second set of touch nodes, different from the first set of the touch nodes. In some examples, sense circuitry can be configured to, during a first scan, sense a first combined touch signal of the first set of the touch nodes, and during a second scan, sense a second combined touch signal of the second set of the touch nodes. A touch processor can be configured to determine a touch image at the plurality of touch nodes based on the first and second combined touch signals.

27 Claims, 13 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,482,536 B1 | 7/2013 | Young |
| 8,531,433 B2 | 9/2013 | Bulea |
| 8,692,801 B2 | 4/2014 | Luo et al. |
| 8,830,180 B2 | 9/2014 | Yilmaz et al. |
| 2006/0197753 A1 | 9/2006 | Hotelling |
| 2013/0076647 A1* | 3/2013 | Yousefpor .............. G06F 3/0412 345/173 |
| 2013/0100067 A1* | 4/2013 | Dews .................... G06F 3/0416 345/174 |
| 2016/0070413 A1* | 3/2016 | Geaghan ............... G06F 3/0416 345/174 |
| 2017/0045986 A1* | 2/2017 | Hong .................... G06F 3/0416 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," a Dissertation Submitted to the Faculty of the University of Delaware in Partial Fulfillment of the Requirements for the Degree of Doctor of Philosophy in Electrical Engineering, 364 pages.

\* cited by examiner

| | | | | | | | |
|---|---|---|---|---|---|---|---|
| 0 | 0 | 0 | 0 | 1 | 0 | 0 | 0 |
| 0 | 0 | 1 | 0 | 0 | 0 | 1 | 0 |
| 1 | 0 | 0 | 0 | 0 | 0 | 0 | 1 |
| 0 | 0 | 0 | 0 | 0 | 1 | 0 | 0 |
| 0 | 0 | 0 | 1 | 0 | 0 | 0 | 1 |
| 0 | 0 | 0 | 0 | 1 | 0 | 1 | 0 |
| 0 | 1 | 0 | 0 | 0 | 0 | 0 | 0 |
| 0 | 0 | 0 | 1 | 0 | 1 | 0 | 0 |
| 0 | 0 | 1 | 0 | 0 | 0 | 0 | 1 |
| 0 | 0 | 0 | 0 | 0 | 0 | 1 | 0 |
| 0 | 1 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |
| 1 | 0 | 1 | 0 | 0 | 0 | 0 | 0 |
| 0 | 1 | 0 | 0 | 0 | 0 | 0 | 0 |
| 1 | 0 | 0 | 0 | 0 | 0 | 0 | 0 |

$A_{8 \times 16}$ — 904

FIG. 9A

COMPRESSIVE TOUCH SENSING

CROSS-REFERENCE TO RELATED APPLICATION

This Application claims the benefit of U.S. Provisional Application No. 62/217,698 filed on Sep. 11, 2015, the entire disclosure of which is herein incorporated by reference for all purposes.

FIELD OF THE DISCLOSURE

This relates generally to touch sensor panels, and more particularly, to compressive touch sensing on a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Sensing touch at each touch node of a touch panel or touch screen can require substantial touch sensing resources, especially as the touch panel or touch screen increases in size to include a greater number of touch nodes. The examples of the disclosure provide various compressive touch sensing schemes in which a full touch image of the touch panel or touch screen can be determined without the need to individually sense touch at each touch node of the touch panel or touch screen. In some examples, such compressive touch sensing can include sensing combined touch signals from a plurality of touch nodes on the touch panel or touch screen, and recovering the full touch image from those combined touch signals.

BRIEF DESCRIPTION OF THE DRAWINGS

FIG. 9A illustrates an exemplary sparse {0,1} measurement matrix according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Sensing touch at each touch node of a touch panel or touch screen can require substantial touch sensing resources, especially as the touch panel or touch screen increases in size to include a greater number of touch nodes. The examples of the disclosure provide various compressive touch sensing schemes in which a full touch image of the touch panel or touch screen can be determined without the need to individually sense touch at each touch node of the touch panel or touch screen. In some examples, such compressive touch sensing can include sensing combined touch signals from a plurality of touch nodes on the touch panel or touch screen, and recovering the full touch image from those combined touch signals.

Figure 1A:
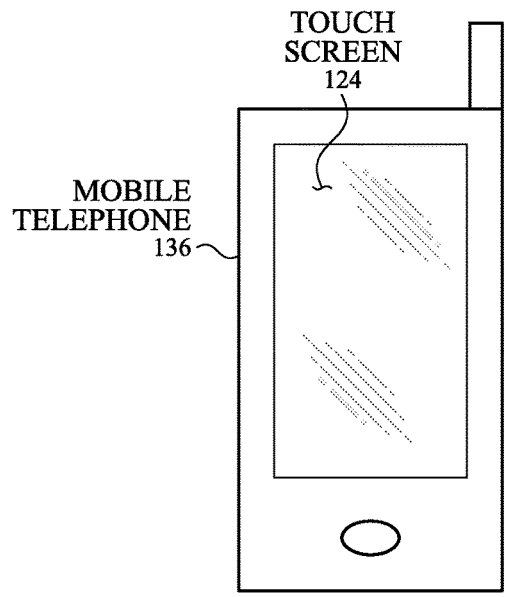
FIGS. 1A-1D illustrate an example mobile telephone, an example media player, an example personal computer and an example tablet computer that can each include an exemplary touch screen according to examples of the disclosure.
Figure 1B:
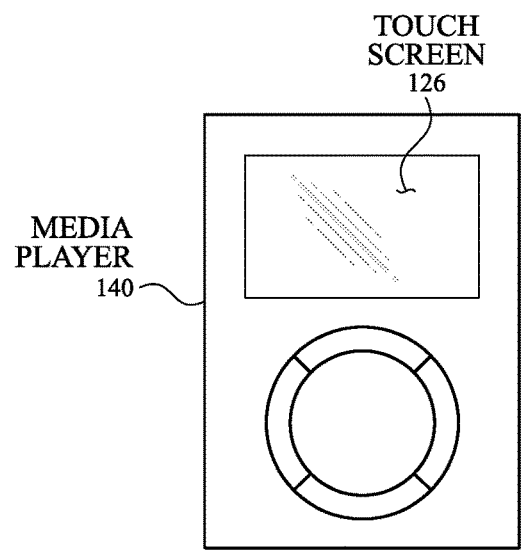
Figure 1C:
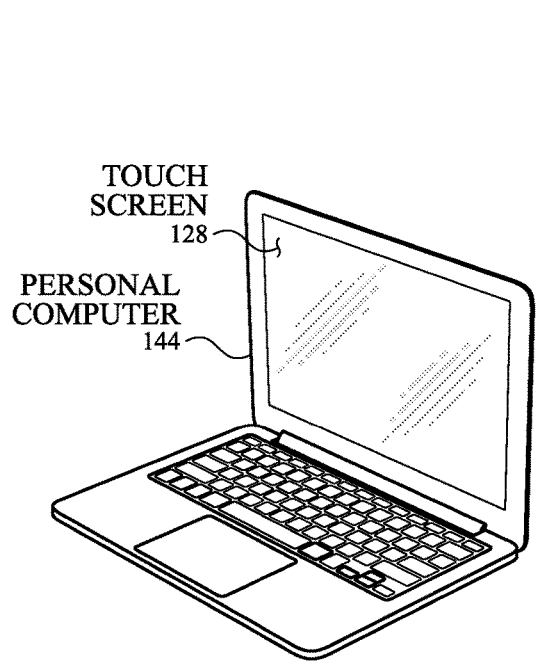
Figure 1D:
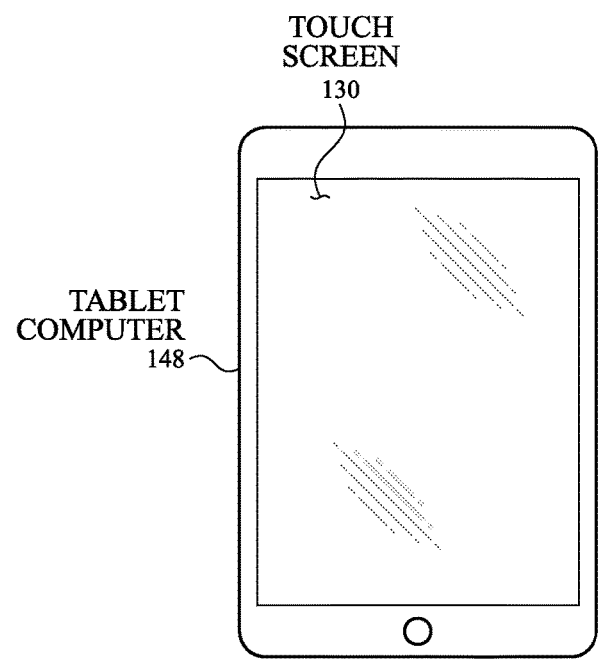

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
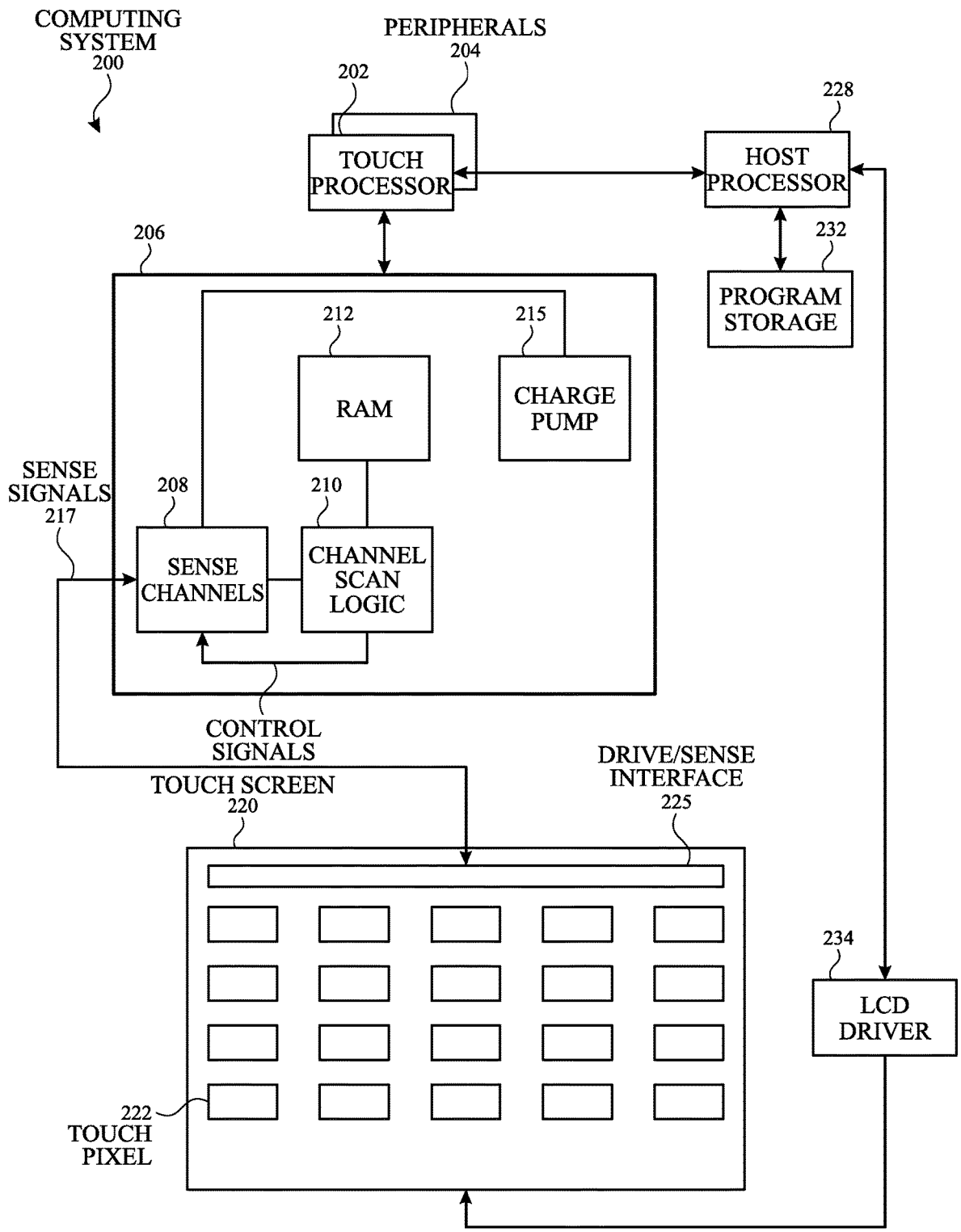
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch node electrodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
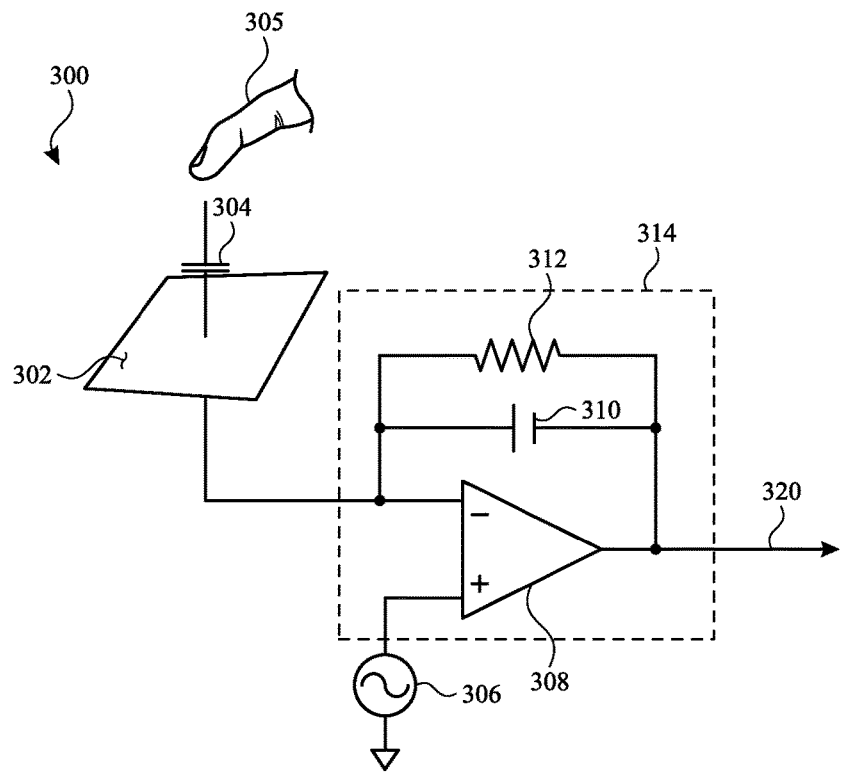
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
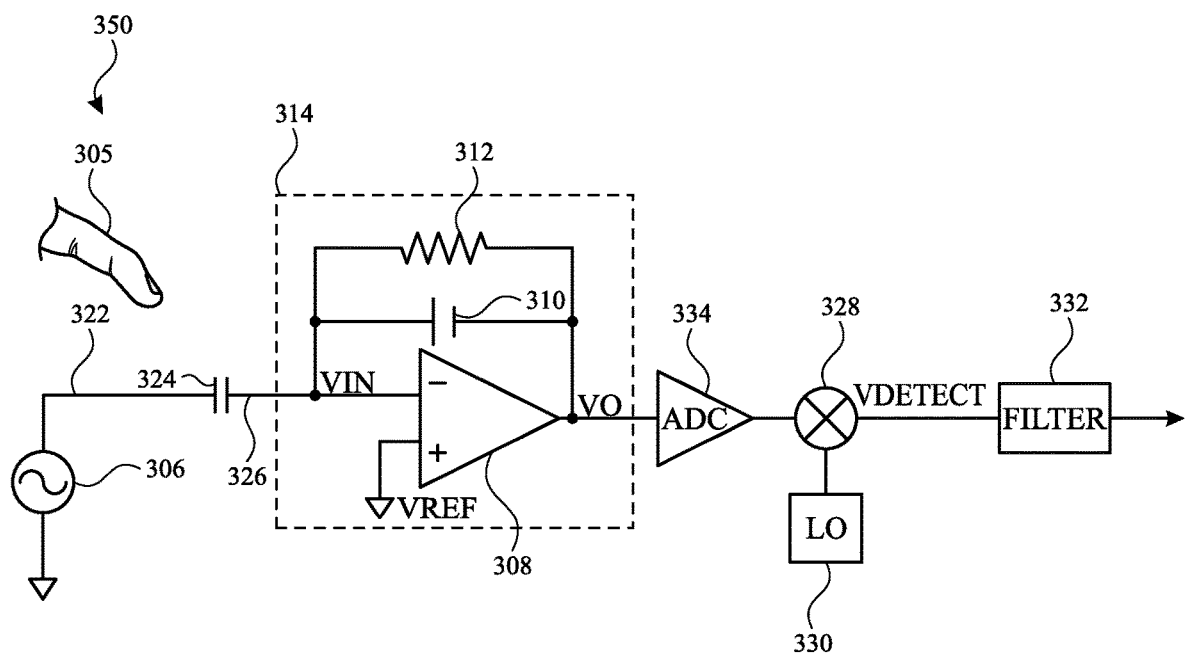
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. In some examples, an analog-to-digital converter (ADC) 334 can be coupled between the output of operational amplifier 308 and multiplier 328, such that the multiplier and filter 332 can operate in the digital, rather than the analog, domain.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
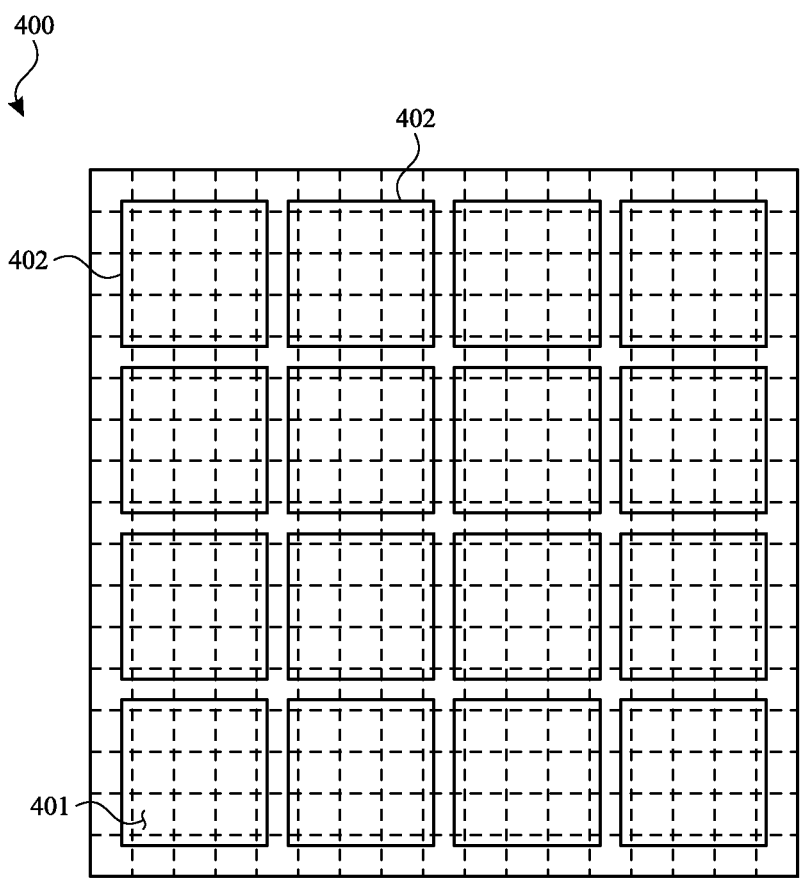
FIG. 4 illustrates an example configuration in which common electrodes can form portions of the touch sensing circuitry of a touch sensing system according to examples of the disclosure.

FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 can include a plurality of display pixels 401 (illustrated as the small squares having dashed-line borders), and each display pixel 401 can include a portion of a common electrode 402, which can be a circuit element of the display system circuitry in the display pixel stackup (i.e., the stacked material layers forming the display pixels) of the display pixels of some types of LCDs or other displays—in other words, the common electrodes can operate as part of the display system to display a display image on touch screen 400.

In the example shown in FIG. 4, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen. A mutual capacitance touch screen can similarly be implemented in which common electrodes can form portions of the touch sensing circuitry of the mutual capacitance touch screen. For example the common electrodes can form drive or sense lines used to detect a touch image on the touch screen, as described above.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

Figure 5:
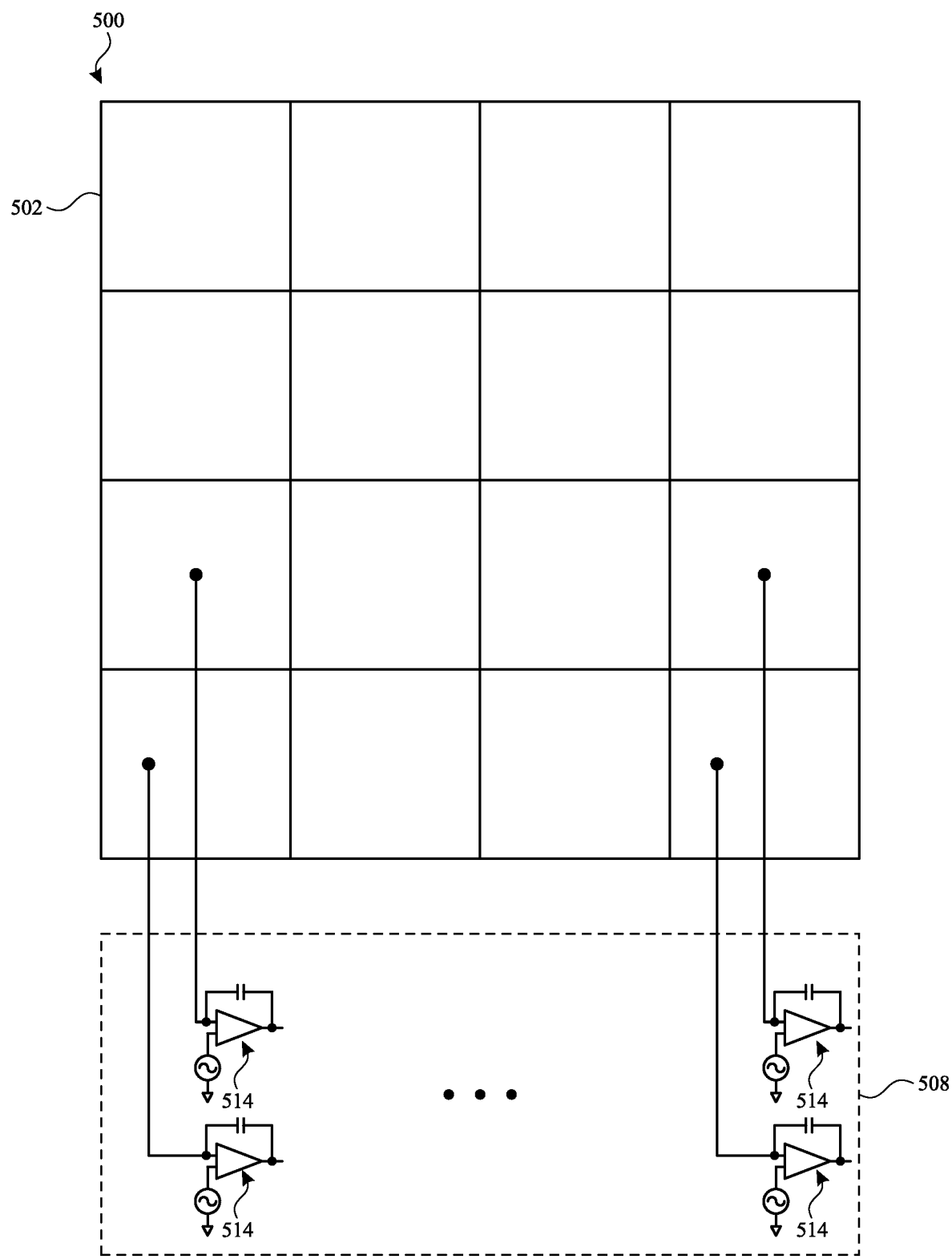
FIG. 5 illustrates an exemplary touch screen sensing configuration according to examples of the disclosure.

FIG. 5 illustrates an exemplary touch screen 500 sensing configuration according to examples of the disclosure. Touch screen 500 can include touch node electrodes 502, as previously described, and can correspond to touch screen 220 in FIG. 2 or touch screen 400 in FIG. 4. Touch screen 500 can be coupled to sense circuitry 508 (e.g., corresponding to sense channels 208 in FIG. 2), which can include sensing circuits 514 (e.g., corresponding to sensing circuit 314 in FIG. 3A). The configuration of sensing circuits 514 can be substantially that of sensing circuits 314 in FIG. 3A (e.g., the same as that in FIG. 3A), the details of which will be omitted here for brevity.

In some examples, in order to sense a touch image across touch screen 500 (e.g., an amount of touch—or, a "touch value"—for each touch node electrode 502 on touch screen 500), each touch node electrode 502 can be individually sensed by sensing circuits 514. In other words, each touch node electrode 502 can be coupled to its own sensing circuit 514, which can sense touch at that touch node electrode. As such, a touch image across touch screen 500 can be sensed. It is understood that as used in this disclosure, a touch image across the touch screen can include information about one or more objects in proximity to, but not touching, the touch screen, though the phrase "touch" image and similar phrases will be used for ease of description.

The touch sensing configuration of FIG. 5 can require a relatively large amount of touch sensing resources. Specifically, the number of sensing circuits 514 required can be equal to the number of touch node electrodes 502 on touch screen 500. In some examples, sense circuitry 508, and thus sensing circuits 514, can be fabricated as an integrated circuit (e.g., an ASIC). As the numbering of sensing circuits 514 in sense circuitry 508 is increased, the complexity, expense and/or size of the sense circuitry ASIC can correspondingly be increased. Additionally, the total time resources expended towards touch sensing on touch screen 500 (i.e., the "total sensing cost") can become relatively large as the number of touch node electrodes 502, and thus sensing circuits 514, increases. For example, if the time to sense a touch node electrode 502 is expressed as T, and touch screen 500 has P rows and Q columns of touch node electrodes, the total sensing cost of the touch screen sensing configuration of FIG. 5 can be expressed as:

$$\text{Total sensing cost}=P*Q*T \quad (1)$$

As reflected in equation (1), as the number of touch node electrodes 502 in touch screen 500 increases, the total sensing cost of the sensing configuration of FIG. 5 can become quite large. As such, it can be beneficial to implement a touch sensing scheme that has a lower total sensing cost than that expressed above. One such touch sensing scheme can be referred to as "compressive touch sensing," which will be described in more detail below. In the compressive touch sensing schemes of this disclosure, if the touch activity on the touch screen is "sparse" (e.g., relatively few objects, such as one, two or three, are touching or in proximity to the touch screen, while the remainder of the touch screen is untouched), the touch values for all of the touch node electrodes of the touch screen can be accurately determined using fewer touch measurements than there are touch node electrodes on the touch screen. Utilizing compressive touch sensing according to this disclosure can, thus, reduce the total sensing cost of sensing touch on touch screen 500, which can allow for: 1) reducing the total number of sensing circuits 514 needed to sense touch on the touch screen, if the sensing time T for each touch node electrode 502 remains constant, which can simplify and reduce the cost and size of sense circuitry 508, 2) increasing the sensing time T for each touch node electrode, if the number of sensing circuits remains constant, which can increase the signal-to-noise ratio of the touch screen, or 3) any combination of 1) and 2). In some examples, the compressive touch sensing schemes of this disclosure can be utilized even when the touch activity on the touch screen is not "sparse," though the accuracy with which the touch values of the touch node electrodes of the touch screen are determined may potentially be reduced. In some examples, the touch screen can dynamically implement the compressive touch sensing schemes of this disclosure, such that when the touch activity on the touch screen is "sparse" (e.g., fewer than a threshold number of contacts or touches concurrently detected on the touch screen), the touch screen can implement compressive touch sensing, and when the touch activity on the touch screen is "dense" (e.g., greater than the threshold number of contacts or touches concurrently detected on the touch screen), the touch screen can cease implementing compressive touch sensing, and instead can directly measure touch values at the touch node electrodes of the touch screen (e.g., as described with reference to FIGS. 3A-3B and/or 5).

A compressive touch sensing scheme, as described in this disclosure, can allow for the reconstruction of an accurate touch image across the touch screen of the disclosure with a total sensing cost that can be less than that in equation (1), above. Such a scheme can be based on measurements performed in accordance with one or more touch measurement matrices, as will be described below. It should be noted that although compressive touch sensing according to examples of the disclosure may be described primarily in the context of a touch screen, it can also be applied to a touch sensor panel.

Figure 6:
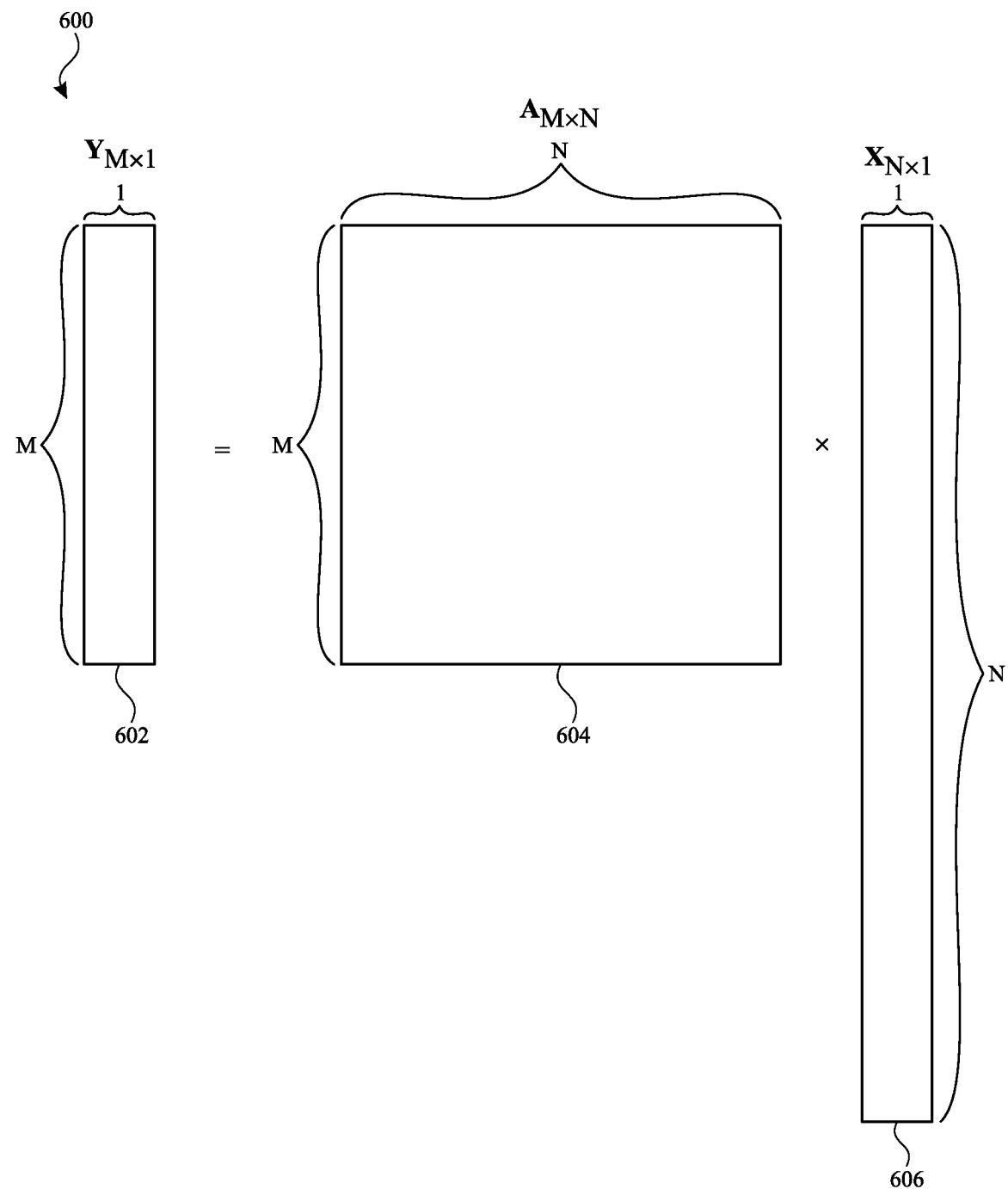
FIG. 6 illustrates an exemplary framework for a compressive touch sensing scheme according to examples of the disclosure.

FIG. 6 illustrates an exemplary framework 600 for a compressive touch sensing scheme according to examples of the disclosure. In non-touch-specific terms, array $Y_{m \times 1}$ 602 can be an m by 1 array of values, measurement matrix $A_{m \times n}$ 604 can be an m by n linear matrix of values, and array $X_{n \times 1}$ 606 can be an n by 1 array of values. In some examples, the accuracy of the touch image determined using the compressive touch sensing scheme of the disclosure can increase as n gets larger than m. Thus, desired touch image accuracy can be balanced against touch sensing resources or other constraints, among additional or alternative factors, in determining how much larger n is than m. Array Y 602, measurement matrix A 604 and array X 606 can have the following relationship, as illustrated:

$$Y = A * X \quad (2)$$

In touch-specific terms, in some examples, array Y 602 can correspond to touch measurements obtained from one or more touch node electrodes of the touch screen of the disclosure (e.g., a subset of the touch node electrodes of the touch screen). The touch measurements reflected in array Y 602 can be distinct touch measurements performed on one or more touch node electrodes (e.g., the first entry in array Y 602 can be a touch measurement performed at a first set of touch node electrodes at a first time, and the second entry in array Y 602 can be a touch measurement performed at a second set of touch node electrodes at a second time, after the first time). Array X 606 can correspond to a full touch image across the touch screen of the disclosure (e.g., a touch image obtained if every touch node electrode on the touch screen is separately sensed, as discussed with reference to FIG. 5), as will be described later. As discussed above, if the full touch image across the touch screen of the disclosure is a sparse touch image/signal (e.g., a touch image indicating one, two, three, four, five, etc. objects, such as fingers, touching the touch screen, corresponding to non-zero touch values for "touched" touch nodes, while the remainder of the touch screen is untouched, corresponding to substantially zero touch values for "untouched" touch nodes), the full touch image X 606 can be recovered, with high probability, from the measurements in array Y 602 using an appropriate measurement matrix A 604, described in more detail below, according to equation (2). This recovery of the full touch image as part of the compressive touch sensing schemes of the disclosure can be performed by, for example, touch processor 202 in FIG. 2.

Measurement matrix A 604 can be composed of values $\alpha_{x,y}$, where x can correspond to a row number of the measurement matrix, and y can correspond to a column number of the measurement matrix. In other words, $\alpha_{x,y}$ can correspond to a value at row x and column y of measurement matrix A 604. A given value of array Y 602 can correspond to the result of vector multiplication of a corresponding row of measurement matrix A 604 with array X 606, according to equation (2). For example:

$$Y_1 = A_{1 \times n} * X_{n \times 1} \quad (3)$$

where $Y_1$ can correspond to a first value of array Y, and $A_{1 \times n}$ can correspond to the first row of measurement matrix A. Individual entries in $A_{1 \times n}$ can correspond to touch node electrodes on the touch screen, as will be described below.

Other values of array Y 602 can analogously correspond to vector multiplications of corresponding rows of measurement matrix A 604 with array X 606. Therefore, given m measurement values measured at the touch screen in array Y 602, in a manner that will be described below, a full touch image on the touch screen (corresponding to array X 606) can be recovered with high accuracy using measurement matrix A 604 according to the relationships given in equations (2) and (3). As a result, n touch values in array X 606 can be recovered by performing only m measurements in array Y 602, where m<<n, as previously described. Such compressive touch sensing can, therefore, save substantial touch sensing resources as compared with sensing each touch node electrode on the touch screen individually (e.g., as described with reference to FIG. 5).

Figure 7:
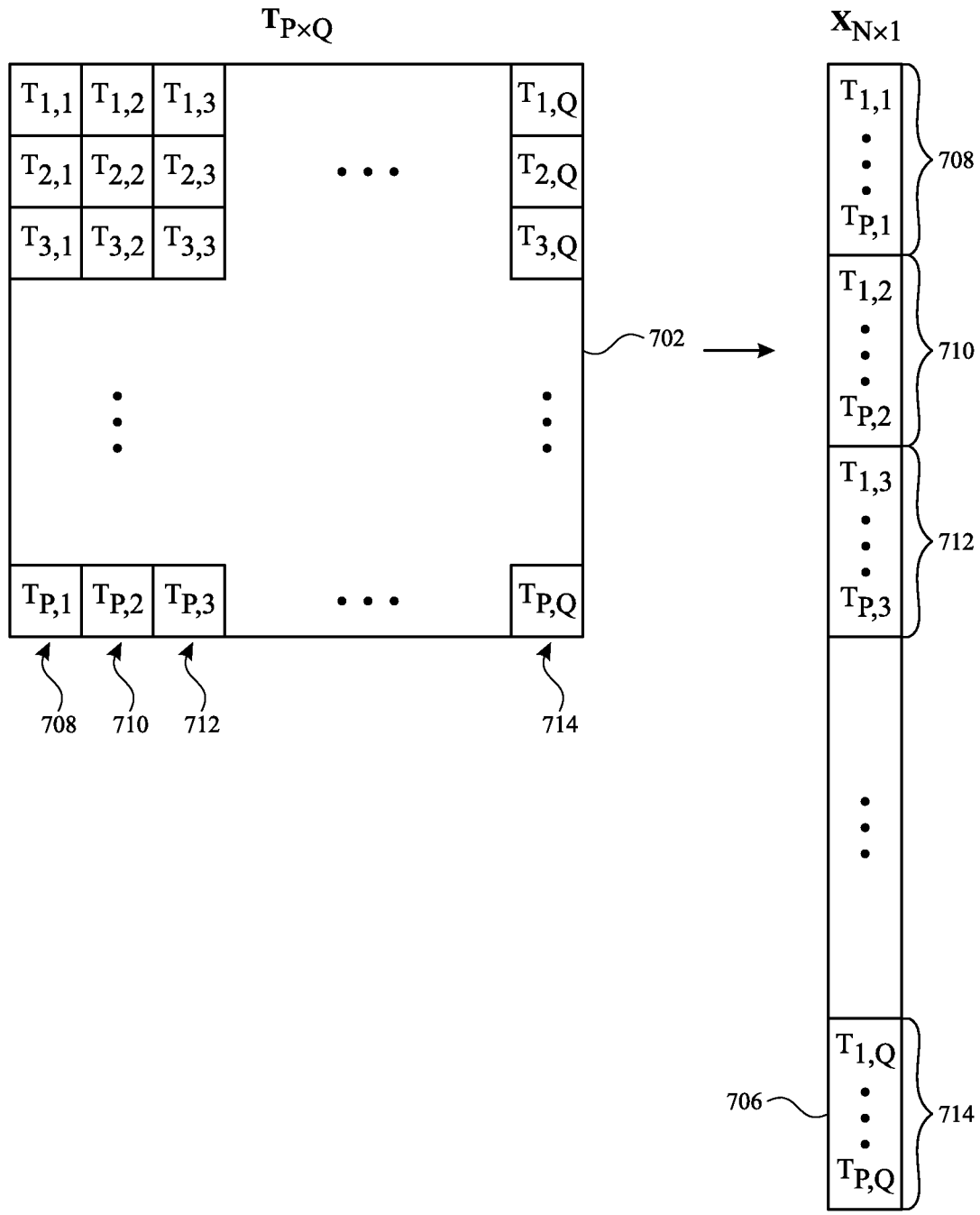
FIG. 7 illustrates an exemplary relationship between the layout of a touch screen and array X according to examples of the disclosure.

To effectively utilize the relationship expressed in equation (2) to determine a full touch image on the touch screen using the compressive touch sensing of the disclosure, it can be necessary to express the full touch image as a one-dimensional array for use in equation (2) (e.g., array X 606 in FIG. 6). The manner in which this is done can be related to the configuration of the touch screen of the disclosure. FIG. 7 illustrates an exemplary relationship between the layout of a touch screen and array X 706 according to examples of the disclosure. Array X 706 can correspond to array X 606 in FIG. 6. As previously discussed, in equation (2), array X 606 (and array X 706) can correspond to a touch image from the touch screen of the disclosure. However, array X 606 (and array X 706) can be a one-dimensional array (e.g., an n by 1 array, as previously discussed), whereas a touch image detected on the touch screen of the disclosure can be a two-dimensional touch image (e.g., a P by Q touch image of touch values, corresponding to a P by Q array of touch node electrodes on the touch screen). Therefore, in order to utilize equation (2) to recover a touch image on the touch screen, it can be useful to represent the two-dimensional touch image from the touch screen as a one-dimensional array—e.g., array X 606. This can be accomplished by "vectorizing" the matrix corresponding to the touch screen, as will be described below.

Specifically, in some examples, if the touch screen comprises a P by Q matrix of touch node electrodes, as previously described, a touch image corresponding to the touch screen can be represented by matrix T 702—a P by Q matrix of touch values $T_{x,y}$. Each element of matrix T 702 can represent a touch value of a touch node electrode on a touch screen or touch panel. The touch node electrodes can be coupled to a touch sensor circuit (e.g., sensing circuit 314), and the output of the touch sensor circuit can be converted to a value representative of the touch value of the touch node electrode. For example, column 708 of touch image matrix T 702 can include P touch values from $T_{1,1}$ to $T_{P,1}$, as illustrated. Columns 710 and 712 of touch image matrix T 702 can similarly include touch values from corresponding columns of touch node electrodes of the touch screen. Finally, column 714 of touch image matrix T 702 can include corresponding P touch values from $T_{1,Q}$ to $T_{P,Q}$. Touch image matrix T 702 can be vectorized into a one-dimensional array by sequentially appending columns of the touch image matrix T together to form one-dimensional array X 706. For example, column 708 of touch image matrix T 702 can be placed at the top of array X 706, followed by column 710 of the touch image matrix T and column 712 of the touch image matrix T. This appending can be repeated through column 714 of the touch image matrix T 702. In this way, the touch values $T_{x,y}$ in touch image matrix 702, and their corresponding touch node electrodes, can correspond to positions in array X 706, which can be in a form that can be used in equation (2), above. It is understood that touch image matrix T 702 can be vectorized in any suitable manner within the scope of the disclosure, and is not limited to being vectorized by column. For example, touch image matrix T 702 can be vectorized into array X 706 by rows instead of columns.

Figure 8:
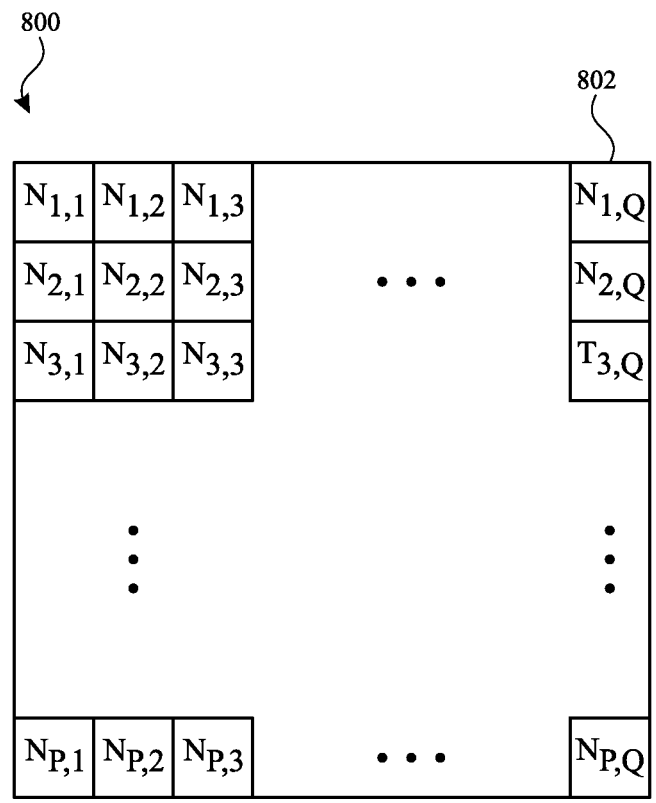
FIG. 8 illustrates an exemplary touch screen and sensing circuit coupling configuration for compressive touch sensing according to examples of the disclosure.
Figure 8:
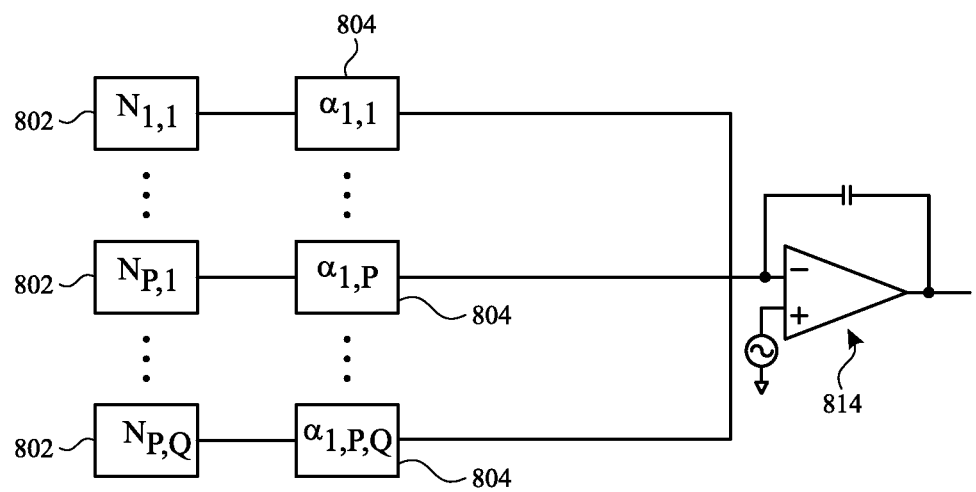

Exemplary details of touch sensing on the touch screen of the disclosure using the compressive touch sensing scheme described above will now be provided. FIG. 8 illustrates an exemplary touch screen 800 and sensing circuit 814 coupling configuration for compressive touch sensing according to examples of the disclosure. As previously described, touch screen 800 can include P by Q touch node electrodes 802, represented by $N_{x,y}$. The discussion that follows will, when appropriate, refer to array Y 602, measurement matrix A 604 and array X 606 in FIG. 6.

According to equation (2), the values of array Y 602 in FIG. 6 that can be measured on touch screen 800, and from which the full touch image on the touch screen can be recovered, can be the result of vector multiplication of measurement matrix A 604 and the vectorized full touch image, array X 606. Therefore, each value of array Y 602 can be the result of a collection of measurements of touch node electrodes 802, weighted by corresponding measurement matrix A 604 values $\alpha_{x,y}$. For example, the first value in array Y 602, $Y_1$, can be expressed as:

$$Y_1 = \alpha_{1,1} * N_{1,1} + \alpha_{1,2} * N_{2,1} + \alpha_{1,3} * N_{3,1} + \ldots + \alpha_{1,PQ} * N_{P,Q} \quad (4)$$

Each value of array Y 602 can be determined in a separate scan of touch screen 800—thus, the total number of scans of the touch screen required to determine all of the values of array Y can be m scans (the length of array Y, and the row-dimension of measurement matrix A 604). FIG. 8 illustrates an exemplary touch sensing configuration for a first scan of touch screen 800; subsequent scans can be similarly configured according to the discussion below.

During the first scan of touch screen 800, each touch node electrode 802 can be coupled to a scaler 804, which can output scaled signals from the touch node electrodes into the inverting input of sensing circuit 814. Specifically, every touch node electrode 802 can be coupled together, via respective scalers 804, into the inverting input of sensing circuit 814. Scaler 804 can be any suitable circuitry or logic that can scale an input signal and output the scaled input signal. In some examples, scalers 804 can be programmable such that the amount by which they scale their inputs can be changed for each scan of touch screen 800 according to the elements of the measurement matrix used. The configuration of sensing circuit 814 can be substantially that of sensing circuit 314 in FIG. 3A (e.g., the same as sensing circuit 314 in FIG. 3A), the details of which will not be repeated here for brevity. The amount by which scalers 804 scale the signal from corresponding touch node electrodes 802 can be based on the value $\alpha$ in measurement matrix A 604 corresponding to that particular touch node electrode. For example, a scaler 804 can scale the output from $N_{1,1}$ 802 by $\alpha_{1,1}$—the value in measurement matrix A 604 corresponding to the first position in array X 606, which can correspond to touch node electrode $N_{1,1}$, as described with reference to FIG. 7. Similarly, a scaler 804 can scale the output from $N_{P,1}$ 802 by $\alpha_{1,P}$—the value in measurement matrix A 604 corresponding to the P-th position in array X 606, which can correspond to touch node electrode $N_{P,1}$, as described with reference to FIG. 7. Outputs from the remaining touch node electrodes 802 on touch screen 800 can similarly be scaled by the appropriate value $\alpha$ from measurement matrix A 604, and collectively inputted into sensing circuit 814. The output from sensing circuit 814 can then be represented by a corresponding first value in array Y 602. The remaining (m−1) positions of array Y 602 can be populated by performing (m−1) more scans of touch screen 800 in the manner described above, using appropriate scaling factors from appropriate rows of measurement matrix A 604. After performing m scans of touch screen 800, array Y 602 can be populated with m measurement values, from which array X 606—corresponding to a full touch image on the touch screen—can be recovered.

Specifically, the collection of m measurements $Y_{m \times 1}$ sensed using measurement matrix A 604 can be represented by:

$$Y_{m\times 1} = A_{m\times n} * X_{n\times 1} \quad (5)$$

In some examples, it can be beneficial to ensure, as much as possible, that the touch image to be recovered, $X_{n\times 1}$, will be a sparse touch image, as previously described. Thus, it can be beneficial to perform baseline measurements on touch screen 800 when the touch screen is in a no-touch condition (i.e., when no touch activity is detected on the touch screen for more than a predetermined period of time, such as 1, 5 or 20 seconds). These baseline measurements, which can be subtracted from subsequent measurements to obtain substantially touch-only measurements (e.g., touch measurements having baseline measurements subtracted therefrom), can be represented as $Y_{m\times 1}^b$. Therefore, the change in the measurements Y due to changes in touch screen capacitance induced by touch can be expressed as:

$$\Delta Y_{m\times 1} = Y_{m\times 1} - Y_{m\times 1}^b \quad (6)$$

$$= A_{m\times n} * X_{n\times 1} - A_{m\times n} * X_{n\times 1}^b \quad (7)$$

$$= A_{m\times n} * \Delta X_{n\times 1} \quad (8)$$

where $\Delta X_{n\times 1}$ represents a substantially touch-data-only touch image across the touch screen—a sparse signal that can be suitable for the compressive touch sensing of this disclosure.

Having determined $\Delta Y_{m\times 1}$ from touch screen measurements, as discussed above, and knowing $A_{m\times n}$, $\Delta X_{n\times 1}$—corresponding to the full touch image across the touch screen—can be recovered according to equation (8). For example, $\Delta X_{n\times 1}$ can be recovered using constrained l1-norm minimization of the form:

$$\Delta \hat{X} = \arg\min_{\Delta \tilde{X}} \|\Delta \tilde{X}\|_{l_1} \quad (9)$$

subject to the constraint that $\Delta Y = A * \Delta \tilde{X}$. If the measurements on the touch screen are subject to imperfections such as noise, $\Delta X_{n\times 1}$ can be recovered using equation (9), as above, except subject to the l2-norm constraint that $\|\Delta Y - A * \Delta \tilde{X}\|_{l_2} \leq \in$, where $\in$ can represent an acceptable error amount in the above determination.

In accordance with the compressive touch sensing disclosed above, a full touch image across the touch screen of the disclosure can be obtained by performing m measurement scans on the touch screen instead of n measurement scans on the touch screen, where m<<n. The total sensing cost of determining a touch image on the touch screen can, thus, be reduced as compared with the sensing cost expressed in equation (1). For example, if m=n/2, the total sensing cost of determining a touch image on the touch screen can be PQT/2, as compared with PQT in the touch sensing scheme described with reference to FIG. 5. As a result of the compressive touch sensing of the disclosure, in some examples, fewer sensing scans can be utilized (e.g., m=n/3), fewer sensing circuits can be utilized, longer sensing times can be utilized, and/or any combination of the above can be utilized.

In some examples, performing compressive touch sensing using a measurement matrix in which most or all elements are scalars may not be desirable due to resource cost and/or practical reasons. For example, because every signal outputted from every touch node electrode may need to be scaled by a scaler in such a scheme, as described with reference to FIG. 8, the area and resources consumed by such scalers on, for example, a sensing ASIC may become very large. Additionally, it may become difficult to input signals from every touch node electrode on the touch screen to a sensing circuit, especially as the number of touch node electrodes on the touch screen increases (e.g., 100, 500 or 1000 touch node electrodes). Therefore, in some examples, it can be beneficial to utilize a measurement matrix $A \in \{0, 1\}^{m\times n}$, where the measurement matrix is an m by n sparse matrix of values κ and 1 (i.e., a relatively small number of entries having values of 1, with the remaining entries having values of 0). For example, a "sparse" measurement matrix in the context of this disclosure can be a matrix with fewer than half, a third, a quarter or a fifth of its entries having non-zero values (e.g., 1 or a scalar), with its remaining entries having values of 0. With such a measurement matrix, only touch node electrodes corresponding to the "1" (or non-zero) entries in the measurement matrix may need to be coupled to sensing circuits, and in the case of "1" entries, scaling of outputs from touch node electrodes may not be required, as will be described below.

FIG. 9A illustrates an exemplary sparse {0,1} measurement matrix A 904 according to examples of the disclosure. Measurement matrix A 904 can be an 8 by 16, sparse {0,1} measurement matrix for a touch screen having 16 touch node electrodes (e.g., an 8 by 2 or a 4 by 4 touch screen). In some examples, each row of measurement matrix A 904 can include an equal number of "1" entries—three, in this case—and an equal number of remaining "0" entries—13, in this case, though in some examples, this may not be the case. In some examples, every column of measurement matrix A 904 can include at least one "1" entry; in other words, each touch node electrode on the touch screen can be sensed at least once as a result of the scans performed on the touch screen. In some examples, high-girth, low-density parity-check (LDPC) matrices can be used as measurement matrix A 904, including progressive edge-growth and Gallager LDPC matrices. Measurement matrix A 904 can be such an LDPC matrix, and the values of the measurement matrix A can be as illustrated in FIG. 9A.

Figure 9B:
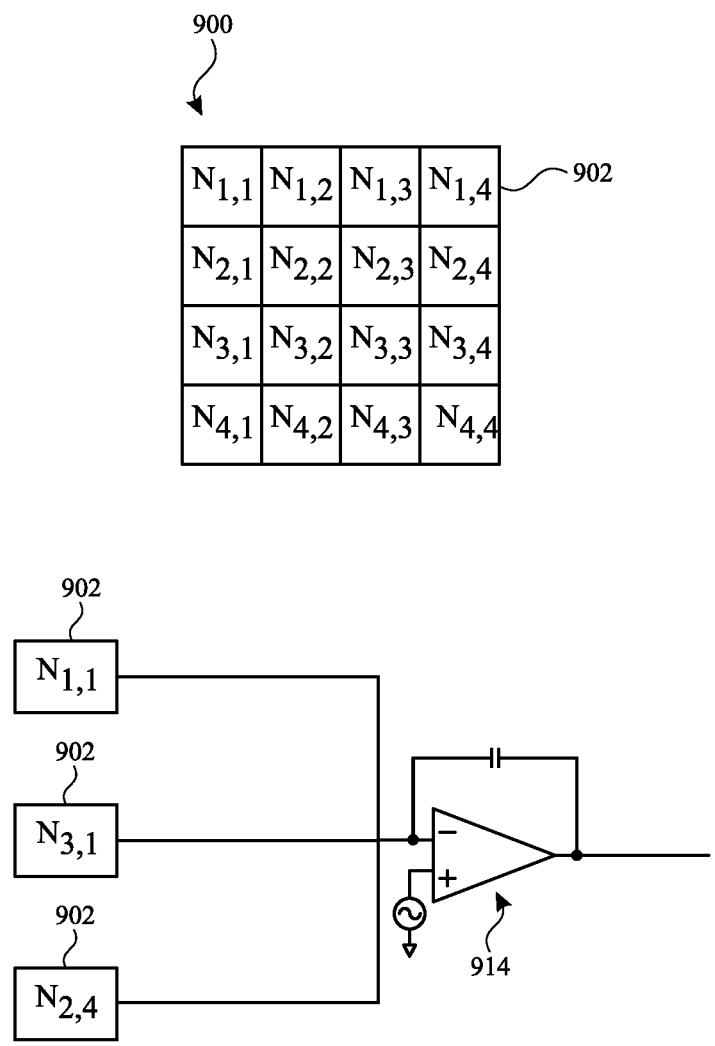
FIG. 9B illustrates an exemplary touch screen and sensing circuit coupling configuration for a first scan of a compressive touch sensing scheme using a sparse {0,1} measurement matrix according to examples of the disclosure.

FIG. 9B illustrates an exemplary touch screen 900 and sensing circuit 914 coupling configuration for a first scan of a compressive touch sensing scheme using a sparse {0,1} measurement matrix according to examples of the disclosure. Touch screen 900 can include 16 touch node electrodes $N_{x,y}$ 902, as illustrated, though it is understood that the following discussion can apply analogously to touch screens having different numbers or configurations of touch node electrodes. The compressive touch sensing scheme of FIG.

9B can utilize measurement matrix A 904, though different measurement matrices can similarly be used.

For each of the eight measurement scans to be performed on touch screen 900—one for each row of measurement matrix A 904—signals from various combinations of touch node electrodes 902 can be coupled together and inputted into the inverting input of sensing circuit 914. Specifically, for the first scan, signals from $N_{1,1}$ 902, $N_{3,1}$ and $N_{2,4}$ (e.g., a first set of touch node electrodes) can be coupled together or combined, and inputted into sensing circuit 914, because the non-zero entries in the first row of measurement matrix A 904 can correspond to $N_{1,1}$, $N_{3,1}$ and $N_{2,4}$. In other words, sensing circuit 914 can sense a combined self-capacitance of $N_{1,1}$ 902, $N_{3,1}$ and $N_{2,4}$ (or a combined mutual capacitance, in the case of a mutual capacitance touch screen). The combined signal sensed by sensing circuit 914 can be used to populate the first of eight entries—one for each row of measurement matrix A 904—in an array Y.

Figure 9C:
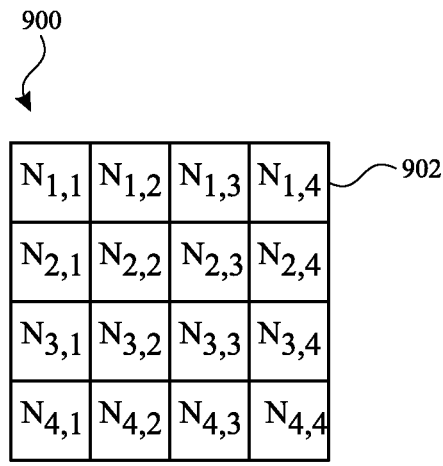
FIG. 9C illustrates an exemplary touch screen and sensing circuit coupling configuration for a second scan of a compressive touch sensing scheme using a sparse {0,1} measurement matrix according to examples of the disclosure.
Figure 9C:
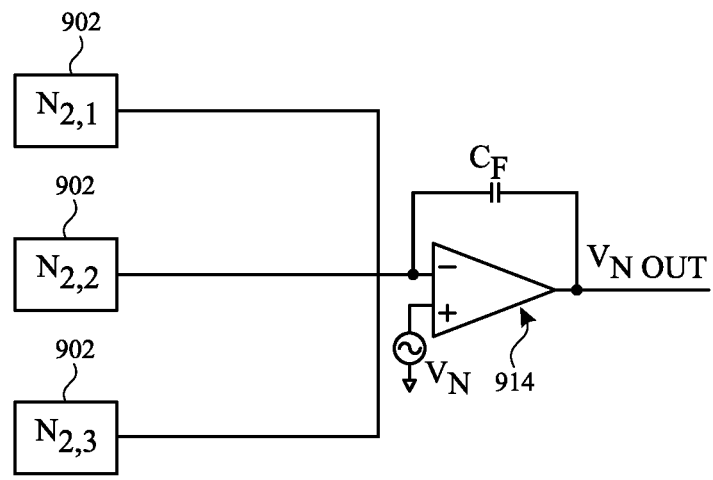

FIG. 9C illustrates an exemplary touch screen 900 and sensing circuit 914 coupling configuration for a second scan of a compressive touch sensing scheme using a sparse {0,1} measurement matrix according to examples of the disclosure. For the second scan, signals from $N_{2,1}$ 902, $N_{2,2}$ and $N_{2,3}$ (e.g., a second set of touch node electrodes) can be coupled together or combined, and inputted into sensing circuit 914, because the non-zero entries in the second row of measurement matrix A 904 can correspond to $N_{2,1}$, $N_{2,2}$ and $N_{2,3}$. In other words, sensing circuit 914 can sense a combined self-capacitance of $N_{2,1}$ 902, $N_{2,2}$ and $N_{2,3}$. Different touch node electrodes 902 can be selectively coupled to sensing circuit 914 in different scan steps using switching circuits that can be coupled between the touch node electrodes and the sensing circuit(s). Such switching circuits can be switching arrays that can couple one or more inputs to one or more outputs of the switching arrays, as appropriate. For example, the switching circuits can include a plurality of switches and/or multiplexers that are selectively configurable to couple two or more touch node electrodes together and to the sensing circuit(s). In some examples, during scan steps in which touch node electrodes 902 are not coupled to sensing circuit 914, the switching circuits can isolate those touch node electrodes from the sensing circuit. For example, during the first scan step of FIG. 9B, the switching circuits can isolate touch node electrodes 902 other than $N_{1,1}$, $N_{3,1}$ and $N_{2,4}$ from sensing circuit 914, and during the second scan step of FIG. 9C, the switching circuits can isolate the touch node electrodes other than $N_{2,1}$, $N_{2,2}$ and $N_{2,3}$ from the sensing circuit.

The combined signal sensed by sensing circuit 914 in FIG. 9C can be used to populate the second of the eight entries—one for each row of measurement matrix A 904—in array Y. The remaining six scans of touch screen 900 can proceed analogously to the manner described above to fully populate array Y with combined sense signals, at which point a full touch image across the touch screen can be recovered from array Y using the compressive touch sensing scheme described above. In some examples, the first scan of FIG. 9B and the second scan of FIG. 9C can be performed sequentially, such that the first set of touch nodes and the second set of touch nodes described above can be coupled to the same sensing circuit 914 during the first and second scans. In some examples, the first scan of FIG. 9B and the second scan of FIG. 9C can be performed concurrently, such that the first set of touch nodes and the second set of touch nodes described above can be coupled to different sensing circuits 914 at the same time.

It should be noted that utilizing a sparse {0,1} measurement matrix in the compressive touch sensing scheme of the disclosure can provide for benefits as compared with utilizing a measurement matrix with most or all elements being scalars. First, because the sparse {0,1} measurement matrix can be composed of relatively few "1" entries with all remaining entries being "0", relatively few touch node electrodes 902 can be coupled to sensing circuit 914 at any one moment in time (e.g., three touch node electrodes, in the examples of FIGS. 9B and 9C). This can reduce routing complexity as compared with compressive touch sensing using a scalar measurement matrix (e.g., each scalar entry in the matrix being drawn from a Gaussian or Bernoulli distribution), which can require that all touch node electrodes 902 on touch screen 900 be coupled to sensing circuit 914 at any one moment in time.

Second, because fewer touch node electrodes 902 can be coupled to sensing circuit 914 when using a sparse {0,1} measurement matrix, the useable dynamic range of the output of the sensing circuit can be improved as compared with using a scalar measurement matrix (e.g., each scalar entry in the matrix being drawn from a Gaussian or Bernoulli distribution). Specifically, the output voltage of sensing circuit 914, $V_{nout}$, can be expressed as:

$$V_{nout}=(1+C_{in}/C_f)*V_n \quad (10)$$

where $C_{in}$ can correspond to the total touch node electrode 902 capacitance coupled to the inverting input of sensing circuit 914, $C_f$ can correspond to the feedback capacitance of the sensing circuit (e.g., capacitance 310 in FIG. 3A), and $V_n$ can correspond to the stimulation signal coupled to the non-inverting input of the sensing circuit (e.g., stimulation signal 306 in FIG. 3A). In the case of a scalar measurement matrix (e.g., each scalar entry in the matrix being drawn from a Gaussian or Bernoulli distribution), because all touch node electrodes 902 (P*Q) can be coupled to the input of sensing circuit 914, and assuming each touch node electrode has a self-capacitance of C, $C_{in}$ can be expressed as:

$$C_{in,G/B}=P*Q*C \quad (11)$$

In contrast, in the case of a sparse {0,1} measurement matrix, $C_{in}$ can be expressed as:

$$C_{in,sparse}=g*C \quad (12)$$

where g can correspond to the number of "1" values in a row of the sparse {0,1} measurement matrix, and where g<<P*Q, as previously discussed. Therefore, compressive touch sensing using a scalar measurement matrix (e.g., each scalar entry in the matrix being drawn from a Gaussian or Bernoulli distribution) can consume a much greater amount of the range of the output of sensing circuit 914 for noise/baseline measurements, as compared with compressive touch sensing using a sparse {0,1} measurement matrix. As such, a sparse {0,1} measurement matrix can allow for more of sensing circuit's 914 output range to be used for sensing touch, and thus can provide for a better signal-to-noise ratio of the touch sensing system.

Figure 10:
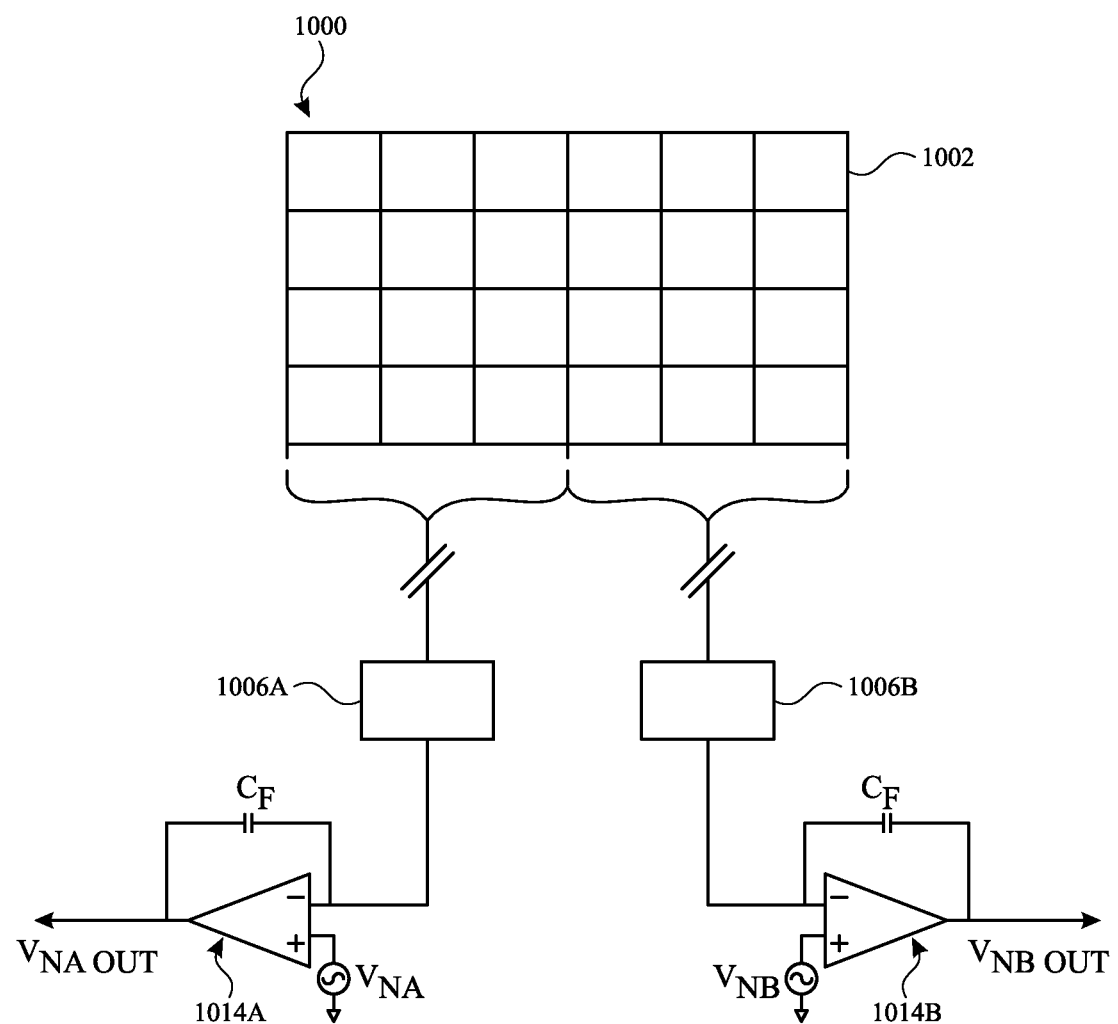
FIG. 10 illustrates an exemplary touch screen and sensing circuit coupling configuration for a compressive touch sensing scheme using multiple sensing circuits according to examples of the disclosure.

In some examples, multiple sensing circuits may be used to sense touch on the touch screen using the compressive touch sensing schemes of the disclosure; in some examples, the multiple sensing circuits can be used simultaneously to sense touch on the touch screen. FIG. 10 illustrates an exemplary touch screen 1000 and sensing circuit 1006A and 1006B coupling configuration for a compressive touch sensing scheme using multiple sensing circuits according to examples of the disclosure. In some examples, the compressive touch sensing scheme of FIG. 10 can utilize sparse {0,1} measurement matrices (thus, the touch signals sensed at touch node electrodes 1002 may not be scaled), but it is understood that in other examples, measurement matrices with scalar elements may be similarly utilized. In the example of FIG. 10, two sensing circuits 1014A and 1014B can be used to sense touch on touch screen 1000. For example, sensing circuit 1014A can be coupled, via switches 1006A, to touch node electrodes 1002 in the left portion of touch screen 1000. Switches 1006A can be configured to selectively couple different sets of touch node electrodes 1002 in the left portion of touch screen 1000 to sensing circuit 1014A during different scans of the left portion of touch screen 1000 according to the compressive touch sensing measurement matrix used by sensing circuit 1014A. Similarly, sensing circuit 1014B can be coupled, via switches 1006B, to touch node electrodes 1002 in the right portion of touch screen 1000. Switches 1006B can be configured to selectively couple different sets of touch node electrodes 1002 in the right portion of touch screen 1000 to sensing circuit 1014B during different scans of the right portion of touch screen 1000 according to the compressive touch sensing measurement matrix used by sensing circuit 1014B. In some examples, sensing circuits 1014A and 1014B can sense touch concurrently in their respective portions of touch screen 1000, and in some examples, sensing circuits 1014A and 1014B can sense touch sequentially in their respective portions of touch screen 1000. Further, in some examples, sensing circuits 1014A and 1014B can sense touch in their respective portions of touch screen 1000 using the same measurement matrix, or different measurement matrices. Finally, while FIG. 10 illustrates the touch node electrodes 1002 corresponding to sensing circuits 1014A and 1014B, respectively, as being located in contiguous regions of touch screen 1000 (e.g., the left portion and the right portion), in some examples, the touch node electrodes corresponding to the sensing circuits can be distributed across touch screen 1000 in a non-contiguous fashion (e.g., touch sensing circuit 1014A can be configured to determine a touch image at a first set of touch node electrodes 1002 that are randomly distributed across touch screen 1000, and touch sensing circuit 1014B can be configured to determine a touch image at a second, mutually exclusive, set of touch node electrodes 1002 that are randomly distributed across touch screen 1000).

In some examples, a scalar measurement matrix may be used to perform the compressive touch sensing of the disclosure (e.g., as described above), and in some examples, a sparse {0,scalar} measurement matrix may be used to perform the compressive touch sensing of the disclosure. For example, one or more of the 1's in measurement matrix 904 in FIG. 9A can be replaced by scalars (e.g., values from 0 to 1, and/or values drawn from a Gaussian or Bernoulli distribution). Thus, it can be necessary to scale the touch signals outputted by touch node electrodes as defined by the scalar values in the measurement matrix. In some examples, the numbers and/or values of the scalars in the measurement matrix can be unconstrained. In such examples, one or more programmable scalers can be coupled between touch node electrodes and sensing circuits, and can be adjustable during different scans of the touch screen to scale the touch signals from the touch node electrodes by amounts defined by the measurement matrix. However, in some examples, the measurement matrix can include only a certain or maximum number of scalars per row (e.g., three, five or seven scalars per row), and/or the values of those scalars can be constrained to be certain fixed values (e.g., 0.1, 0.3, 0.7, etc.). In such examples, a touch screen configuration can include a fixed number of scalers having fixed scaling factors (e.g., the amount by which a certain scaler scales its input signal), and can multiplex or switch between the scalers during different scans of the touch screen as provided by the measurement matrix.

Figure 11:
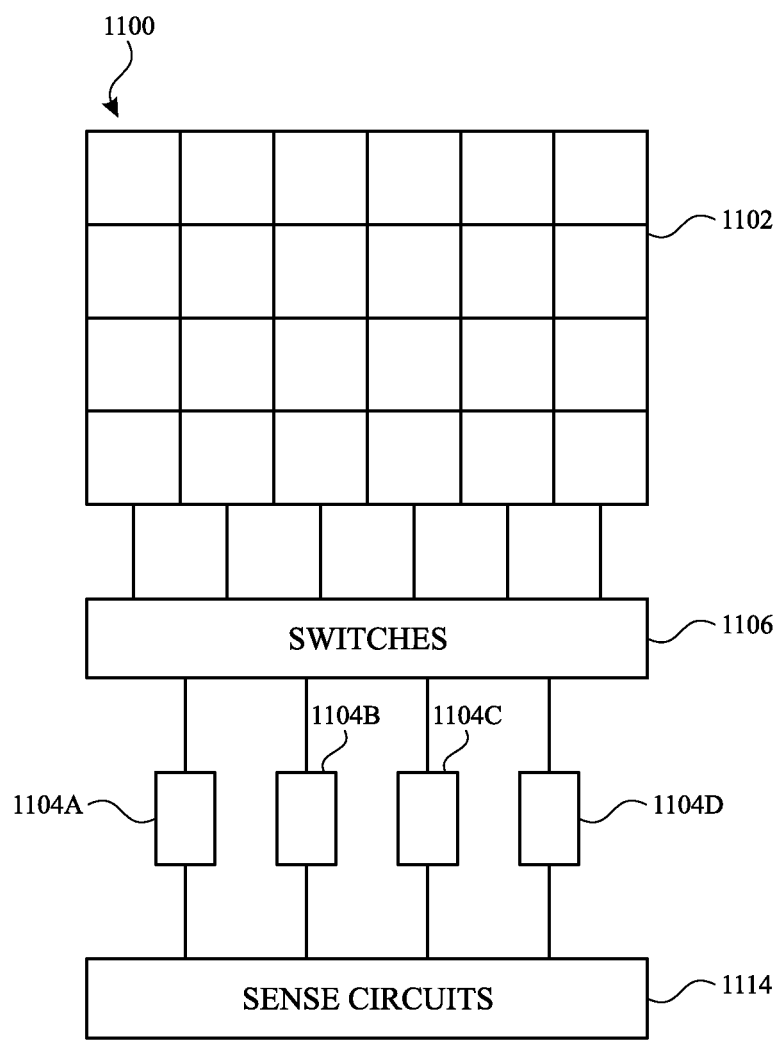
FIG. 11 illustrates an exemplary touch screen and sensing circuit coupling configuration for a compressive touch sensing scheme using a sparse {0,scalar} measurement matrix according to examples of the disclosure.

FIG. 11 illustrates an exemplary touch screen 1100 and sensing circuit 1114 coupling configuration for a compressive touch sensing scheme using a sparse {0,scalar} measurement matrix according to examples of the disclosure. In the example of FIG. 11, sensing circuit(s) 1114 can be used to sense touch on touch screen 1100. Sensing circuit(s) 1114 can be coupled to a fixed number of scalers 1104A, 1104B, 1104C and 1104D (referred to collectively as 1104) having fixed scaling factors (e.g., different fixed scaling factors). It is understood that fewer or more than four scalers can be utilized in an analogous fashion. Scalers 1104 can be selectively coupled to one or more touch node electrodes 1102 via switches 1106, which can be configured to selectively couple sets of one or more touch node electrodes 1102 to one or more of scalers 1104 during different scans of touch screen 1100. In some examples, the number of scalers 1104 can be fewer than the number of touch node electrodes 1102 that are coupled to a given sensing circuit 1114 at a given time. For example, during a given scan of touch screen 1100, switches 1104 can be configured to couple multiple touch node electrodes 1102 to the given sensing circuit 1114 via a single scaler 1104. In some examples, switches 1104 can be configured to couple a first set of one or more touch node electrodes 1102 to a first sensing circuit 1114 via a first scaler 1104, while coupling a second set of one or more touch node electrodes 1102 to a second sensing circuit 1114 via a second scaler 1104. In some examples, during a given scan of touch screen 1100, switches 1104 can be configured to couple a first set of one or more touch node electrodes 1102 to a first sensing circuit 1114 via a first scaler 1104, while coupling a second set of one or more touch node electrodes 1102 to the first sensing circuit 1114 via a second scaler 1104. In some examples, switches 1106 can be configured to couple a first set of touch node electrodes 1102 to sensing circuits 1114 via a first set of scalers 1104 during a first scan of touch screen 1100, and configured to couple a second set of touch node electrodes 1102, different from the first set of touch node electrodes, to sensing circuits 1114 via a second set of scalers 1104, different from the first set of scalers, during a second scan of touch screen 1100 according to the measurement matrix or matrices utilized for the compressive touch sensing scheme that is implemented. Additional coupling and measurement scenarios that follow from the configuration of FIG. 11 and the compressive touch sensing schemes of the disclosure are also contemplated. As additional scans of touch screen 1100 are performed according to the measurement matrix or matrices utilized, switches 1106 can dynamically alter the scalers 1104 via which touch node electrodes 1102 are coupled to sensing circuits 1114 based on the configuration of the measurement matrix or matrices utilized.

Thus, the examples of the disclosure provide various compressive touch sensing techniques for reducing the total sensing cost of touch sensing on a touch screen. With such compressive touch sensing techniques, sense circuitry resources required to sense touch on the touch screen can be reduced, and/or the sensing time used to sense each touch node electrode on the touch screen can be increased to provide a better signal-to-noise ratio of the touch sensing system.

Therefore, according to the above, some examples of the disclosure are directed to a touch sensor panel comprising:

a plurality of touch nodes, the plurality of touch nodes including a first set of touch nodes and a second set of touch nodes, different from the first set of the touch nodes; sense circuitry configured to: during a first scan, sense a first combined touch signal of the first set of the touch nodes; and during a second scan, sense a second combined touch signal of the second set of the touch nodes; and a touch processor configured to determine a touch image at the plurality of touch nodes based on the first and second combined touch signals. Additionally or alternatively to one or more of the examples disclosed above, in some examples, the first combined touch signal comprises a first combined self-capacitance of the first set of the touch nodes, and the second combined touch signal comprises a second combined self-capacitance of the second set of the touch nodes. Additionally or alternatively to one or more of the examples disclosed above, in some examples, the plurality of touch nodes comprises a plurality of touch node electrodes. Additionally or alternatively to one or more of the examples disclosed above, in some examples, the touch sensor panel further comprises: switching circuitry coupled between the plurality of touch nodes and the sense circuitry, the switching circuitry configured to: during the first scan, selectively couple the first set of the touch nodes to the sense circuitry, and during the second scan, selectively couple the second set of the touch nodes to the sense circuitry. Additionally or alternatively to one or more of the examples disclosed above, in some examples, the switching circuitry is further configured to: isolate the second set of the touch nodes from the sense circuitry during the first scan, and isolate the first set of the touch nodes from the sense circuitry during the second scan. Additionally or alternatively to one or more of the examples disclosed above, in some examples, the first set of the touch nodes and the second set of the touch nodes are determined based on a measurement matrix, and the touch processor is configured to determine the touch image at the plurality of touch nodes based on the measurement matrix. Additionally or alternatively to one or more of the examples disclosed above, in some examples, the measurement matrix comprises a sparse {0,1} matrix. Additionally or alternatively to one or more of the examples disclosed above, in some examples, the sense circuitry is a single operational amplifier. Additionally or alternatively to one or more of the examples disclosed above, in some examples, the sense circuitry is configured to perform the first scan and the second scan concurrently, during the first scan, the first set of the touch nodes is coupled to a first sensing circuit in the sense circuitry, and during the second scan, the second set of the touch nodes is coupled to a second sensing circuit in the sense circuitry. Additionally or alternatively to one or more of the examples disclosed above, in some examples, during the first scan, the first set of the touch nodes is coupled to a first sensing circuit in the sense circuitry, and during the second scan, the second set of the touch nodes is coupled to the first sensing circuit in the sense circuitry. Additionally or alternatively to one or more of the examples disclosed above, in some examples, the plurality of touch nodes includes a first number of touch nodes, the sense circuitry is configured to perform a second number of scans, including the first scan and the second scan, the second number of scans being less than the first number of touch nodes, and the touch processor is configured to determine the touch image at the plurality of touch nodes based on the second number of scans. Additionally or alternatively to one or more of the examples disclosed above, in some examples, during the second number of scans, the sense circuitry is configured to sense each touch node of the plurality of touch nodes at least once.

Some examples of the disclosure are directed to a touch sensor panel comprising: a plurality of touch nodes; sense circuitry configured to: during a first scan, sense a first combined touch signal of the plurality of touch nodes; and during a second scan, sense a second combined touch signal of the plurality of touch nodes; and a touch processor configured to determine a touch image at the plurality of touch nodes based on the first and second combined touch signals. Additionally or alternatively to one or more of the examples disclosed above, in some examples, the touch sensor panel further comprises: a plurality of scalers coupled between the plurality of touch nodes and the sense circuitry, the plurality of scalers configured to scale signals from the plurality of touch nodes, and output the plurality of scaled signals to the sense circuitry, wherein the touch processor is configured to determine the touch image at the plurality of touch nodes based on the plurality of scaled signals. Additionally or alternatively to one or more of the examples disclosed above, in some examples, the plurality of scalers is configured to scale the signals from the plurality of touch nodes based on a measurement matrix. Additionally or alternatively to one or more of the examples disclosed above, in some examples, the measurement matrix comprises a Gaussian or Bernoulli distribution-based measurement matrix.

Some examples of the disclosure are directed to a non-transitory computer readable storage medium storing one or more programs, the one or more programs comprising instructions, which when executed by a processor cause the processor to perform a method comprising: during a first scan, sensing, at sense circuitry, a first combined touch signal of a first set of touch nodes; during a second scan, sensing, at the sense circuitry, a second combined touch signal of a second set of touch nodes, different from the first set of the touch nodes, the first set of the touch nodes and the second set of the touch nodes part of a plurality of touch nodes; and determining a touch image at the plurality of touch nodes based on the first and second combined touch signals. Additionally or alternatively to one or more of the examples disclosed above, in some examples, the method further comprises: during the first scan, selectively coupling the first set of the touch nodes to the sense circuitry, and during the second scan, selectively coupling the second set of the touch nodes to the sense circuitry. Additionally or alternatively to one or more of the examples disclosed above, in some examples, the method further comprises: isolating the second set of the touch nodes from the sense circuitry during the first scan, and isolating the first set of the touch nodes from the sense circuitry during the second scan. Additionally or alternatively to one or more of the examples disclosed above, in some examples, the first set of the touch nodes and the second set of the touch nodes are determined based on a measurement matrix, and determining the touch image at the plurality of touch nodes comprises determining the touch image based on the measurement matrix. Additionally or alternatively to one or more of the examples disclosed above, in some examples, the measurement matrix comprises a sparse {0,1} matrix.

Some examples of the disclosure are directed to a method comprising: during a first scan, sensing, at sense circuitry, a first combined touch signal of a first set of touch nodes; during a second scan, sensing, at the sense circuitry, a second combined touch signal of a second set of touch nodes, different from the first set of the touch nodes, the first set of the touch nodes and the second set of the touch nodes part of a plurality of touch nodes; and determining a touch image at the plurality of touch nodes based on the first and second combined touch signals. Additionally or alternatively to one or more of the examples disclosed above, in some examples, the method further comprises: during the first scan, selectively coupling the first set of the touch nodes to the sense circuitry, and during the second scan, selectively coupling the second set of the touch nodes to the sense circuitry. Additionally or alternatively to one or more of the examples disclosed above, in some examples, the method further comprises: isolating the second set of the touch nodes from the sense circuitry during the first scan, and isolating the first set of the touch nodes from the sense circuitry during the second scan. Additionally or alternatively to one or more of the examples disclosed above, in some examples, the first set of the touch nodes and the second set of the touch nodes are determined based on a measurement matrix, and determining the touch image at the plurality of touch nodes comprises determining the touch image based on the measurement matrix.

Some examples of the disclosure are directed to a touch sensor panel comprising: a plurality of touch nodes; sense circuitry configured to: during a first scan, sense a first combined touch signal of a first set of the plurality of touch nodes via a first plurality of scalers; and during a second scan, sense a second combined touch signal of a second set of the plurality of the touch nodes via a second plurality of scalers; and a touch processor configured to determine a touch image at the plurality of touch nodes based on the first and second combined touch signals.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a plurality of touch nodes, the plurality of touch nodes including a first set of touch nodes and a second set of touch nodes, different from the first set of the touch nodes;
sense circuitry configured to:
during a first scan, sense a first combined touch signal of the first set of the touch nodes, wherein during the first scan, the first set of the touch nodes are concurrently sensed by a sense amplifier; and
during a second scan, sense a second combined touch signal of the second set of the touch nodes, wherein during the second scan, the second set of touch nodes are concurrently sensed by a sense amplifier; and
a touch processor configured to determine a touch image at the plurality of touch nodes, wherein the touch image is based on the first and second combined touch signals.

2. The touch sensor panel of claim 1, wherein:
the first combined touch signal comprises a first combined self-capacitance of the first set of the touch nodes, and
the second combined touch signal comprises a second combined self-capacitance of the second set of the touch nodes.

3. The touch sensor panel of claim 1, wherein the plurality of touch nodes comprises a plurality of touch node electrodes.

4. The touch sensor panel of claim 1, further comprising:
switching circuitry coupled between the plurality of touch nodes and the sense circuitry, the switching circuitry configured to:
during the first scan, selectively couple the first set of the touch nodes to an input of the sense amplifier, and
during the second scan, selectively couple the second set of the touch nodes to an input of the sense amplifier.

5. The touch sensor panel of claim 4, wherein the switching circuitry is further configured to:
isolate the second set of the touch nodes from the sense circuitry during the first scan, and
isolate the first set of the touch nodes from the sense circuitry during the second scan.

6. The touch sensor panel of claim 1, wherein the first set of the touch nodes and the second set of the touch nodes are determined based on a measurement matrix, and the touch processor is configured to determine the touch image at the plurality of touch nodes based on the measurement matrix.

7. The touch sensor panel of claim 6, wherein the measurement matrix comprises a sparse $\{0,1\}$ matrix.

8. The touch sensor panel of claim 1, wherein the sense circuitry is a single operational amplifier.

9. The touch sensor panel of claim 1, wherein:
the sense circuitry is configured to perform the first scan and the second scan concurrently,
during the first scan, the first set of the touch nodes is coupled to a first sensing circuit in the sense circuitry, and
during the second scan, the second set of the touch nodes is coupled to a second sensing circuit in the sense circuitry.

10. The touch sensor panel of claim 1, wherein:
during the first scan, the first set of the touch nodes is coupled to a first sensing circuit in the sense circuitry, and
during the second scan, the second set of the touch nodes is coupled to the first sensing circuit in the sense circuitry.

11. The touch sensor panel of claim 1, wherein:
the plurality of touch nodes includes a first number of touch nodes,
the sense circuitry is configured to perform a second number of scans, including the first scan and the second scan, the second number of scans being less than the first number of touch nodes, and
the touch processor is configured to determine the touch image at the plurality of touch nodes based on the second number of scans.

12. The touch sensor panel of claim 11, wherein:
during the second number of scans, the sense circuitry is configured to sense each touch node of the plurality of touch nodes at least once.

13. A touch sensor panel comprising:
a plurality of touch nodes;
sense circuitry configured to:
during a first scan, sense a first combined touch signal of the plurality of touch nodes, wherein during the first scan, the plurality of touch nodes are concurrently sensed by a sense amplifier; and
during a second scan, sense a second combined touch signal of the plurality of touch nodes, wherein during the second scan, the plurality of touch nodes are concurrently sensed by a sense amplifier; and a touch processor configured to determine a touch image at the plurality of touch nodes, wherein the touch image is based on the first and second combined touch signals.

14. The touch sensor panel of claim 13, further comprising:
a plurality of scalers coupled between the plurality of touch nodes and the sense circuitry, the plurality of scalers configured to scale signals from the plurality of touch nodes, and output the plurality of scaled signals to the sense circuitry, wherein the touch processor is configured to determine the touch image at the plurality of touch nodes based on the plurality of scaled signals.

15. The touch sensor panel of claim 14, wherein the plurality of scalers is configured to scale the signals from the plurality of touch nodes based on a measurement matrix.

16. The touch sensor panel of claim 15, wherein the measurement matrix comprises a Gaussian or Bernoulli distribution-based measurement matrix.

17. A non-transitory computer readable storage medium storing one or more programs, the one or more programs comprising instructions, which when executed by a processor cause the processor to perform a method comprising:
during a first scan, sensing, at sense circuitry, a first combined touch signal of a first set of touch nodes, wherein during the first scan, the first set of the touch nodes are concurrently sensed by a sense amplifier;
during a second scan, sensing, at the sense circuitry, a second combined touch signal of a second set of touch nodes, different from the first set of the touch nodes, the first set of the touch nodes and the second set of the touch nodes part of a plurality of touch nodes, wherein during the second scan, the second set of touch nodes are concurrently sensed by a sense amplifier; and
determining a touch image at the plurality of touch nodes, wherein the touch image is based on the first and second combined touch signals.

18. The non-transitory computer readable storage medium of claim 17, the method further comprising:
during the first scan, selectively coupling the first set of the touch nodes to an input of the sense amplifier, and
during the second scan, selectively coupling the second set of the touch nodes to an input of the sense amplifier.

19. The non-transitory computer readable storage medium of claim 18, the method further comprising:
isolating the second set of the touch nodes from the sense circuitry during the first scan, and
isolating the first set of the touch nodes from the sense circuitry during the second scan.

20. The non-transitory computer readable storage medium of claim 17, wherein the first set of the touch nodes and the second set of the touch nodes are determined based on a measurement matrix, and determining the touch image at the plurality of touch nodes comprises determining the touch image based on the measurement matrix.

21. The non-transitory computer readable storage medium of claim 20, wherein the measurement matrix comprises a sparse {0,1} matrix.

22. A method comprising:
during a first scan, sensing, at sense circuitry, a first combined touch signal of a first set of touch nodes, wherein during the first scan, the first set of the touch nodes are concurrently sensed by a sense amplifier;
during a second scan, sensing, at the sense circuitry, a second combined touch signal of a second set of touch nodes, different from the first set of the touch nodes, the first set of the touch nodes and the second set of the touch nodes part of a plurality of touch nodes, wherein during the second scan, the second set of touch nodes are concurrently sensed by a sense amplifier; and
determining a touch image at the plurality of touch nodes, wherein the touch image is based on the first and second combined touch signals.

23. The method of claim 22, further comprising:
during the first scan, selectively coupling the first set of the touch nodes to an input of the sense amplifier, and
during the second scan, selectively coupling the second set of the touch nodes to an input of the sense amplifier.

24. The method of claim 23, further comprising:
isolating the second set of the touch nodes from the sense circuitry during the first scan, and
isolating the first set of the touch nodes from the sense circuitry during the second scan.

25. The method of claim 22, wherein the first set of the touch nodes and the second set of the touch nodes are determined based on a measurement matrix, and determining the touch image at the plurality of touch nodes comprises determining the touch image based on the measurement matrix.

26. The touch sensor panel of claim 1, wherein:
the plurality of touch nodes are arranged along a first axis and along a second axis on the touch sensor panel;
each touch node is identified by a pair of a first coordinate along the first axis and a second coordinate along the second axis; and
the touch nodes of the first set of touch nodes include touch nodes identified by at least two different first coordinates and two different second coordinates.

27. A touch sensor panel comprising:
a plurality of touch nodes, the plurality of touch nodes including a first set of touch nodes and a second set of touch nodes, different from the first set of the touch nodes;
sense circuitry configured to:
in accordance with a number of touch nodes touched concurrently on the touch sensor panel being fewer than a threshold number:
during a first scan, sense a first combined touch signal of the first set of the touch nodes, wherein during the first scan, the first set of the touch nodes are concurrently sensed by a sense amplifier; and
during a second scan, sense a second combined touch signal of the second set of the touch nodes, wherein during the second scan, the second set of touch nodes are concurrently sensed by a sense amplifier;
in accordance with the number of touch nodes touched concurrently on the touch sensor panel not being fewer than the threshold number:
sense individual touch values at each of the touch nodes in the first set of touch nodes and the second set of touch nodes; and
a touch processor configured to determine a touch image at the plurality of touch nodes, wherein:
in accordance with the number of touch nodes touched concurrently on the touch sensor panel being fewer than the threshold number:
the touch image is based on the first and second combined touch signals; and
in accordance with the number of touch nodes touched concurrently on the touch sensor panel not being fewer than the threshold number:
the touch image is based on the individually sensed touch values.

* * * * *